Figure 1:
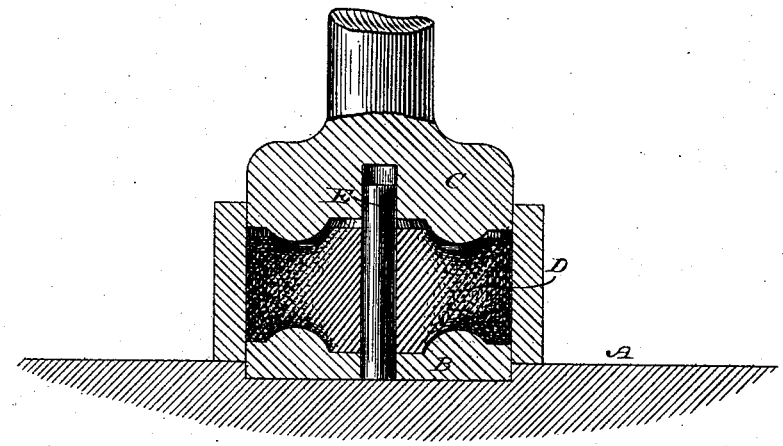

(No Model.)

F. TAYLOR.
VULCANIZED FIBER ROLLER OR WHEEL, &c.

No. 316,847. Patented Apr. 28, 1885.

WITNESSES
Ed. A. Newman.
Al. C. Newman.

INVENTOR
Franklin Taylor,
By his Attorneys
Baldwin, Hopkins & Payton.

United States Patent Office.

FRANKLIN TAYLOR, OF WILMINGTON, DELAWARE, ASSIGNOR TO THE VULCANIZED FIBRE COMPANY, OF SAME PLACE.

VULCANIZED-FIBER ROLLER OR WHEEL, &c.

SPECIFICATION forming part of Letters Patent No. 316,847, dated April 28, 1885.

Application filed January 30, 1885. (No model.)

*To all whom it may concern:*

Be it known that I, FRANKLIN TAYLOR, of Wilmington, county of New Castle, and State of Delaware, have invented certain new and useful Improvements in Vulcanized-Fiber Rollers or Wheels and in the Method of Making Them, of which the following is a specification.

My improved vulcanized-fiber wheel or roller may be used for various purposes—such as friction-rollers, bearing-rollers, or in machinery wherever a non-metallic wheel, or roller, or cam is desired. Wheels of such material are very durable, do not deteriorate rapidly from friction and wear and tear, and serve to deaden the noise of machinery. Vulcanized-fiber wheels have heretofore been largely used for various purposes in machinery and for roller-skates and casters, to all of which they are well adapted. By my present invention I provide a wheel having a body and periphery of much greater hardness and compactness than have heretofore been attained in this material.

Heretofore in making wheels or rollers of vulcanized fiber the blanks have been cut out of a sheet of the fiber of the requisite thickness and then turned down to the desired shape. When made in this manner, the periphery of the wheel is no harder than other parts of the wheel, and the whole wheel is softer than when made according to my plan described below. When the rollers or wheels made according to the old plan are turned with hollow sides—that is, with concave depressions between the hub and the periphery of the wheel—the outer edge of the periphery is thereby weakened, and it is liable to crush down or scale off. This is largely so because the vulcanized fiber is built up into blocks by placing one layer of the material upon another, and when the side of the wheel is turned out as just mentioned the outside layers are cut away between the hub and periphery, so that the layers forming the edge of the periphery have no support except their mere adhesion to the body of the wheel. When the rollers are made according to my present invention, they have an exceedingly hard, compact body, and a harder and more compact rim or periphery, and are therefore much more durable and satisfactory both for use in machinery and roller-skates.

My present invention consists, primarily, in making the rollers by cutting the blanks from a sheet or block of the material, and then forming the wheel under heavy pressure in a die of the desired shape. I have discovered that by this method the material behaves very well, and "flows" in the die so as to fill the die completely and assume a permanent, lasting shape. In this operation the behavior of the material in the die produces a roller having a rim relatively harder than the body of the roller, and the entire roller is hardened and compacted.

Figure 4:
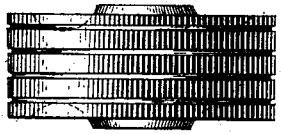
Figure 5:
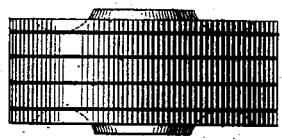
Figure 2:
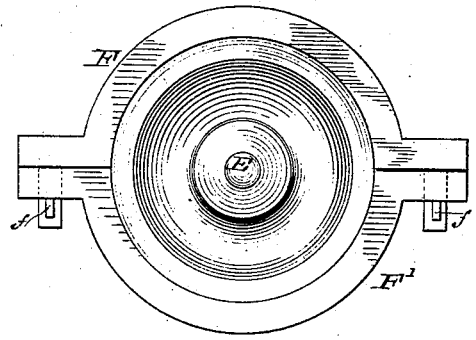
Figure 3:
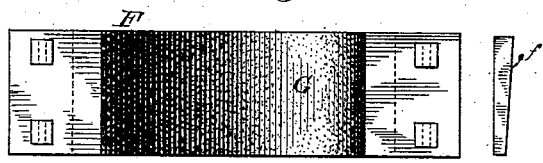

In the accompanying drawings, Figure 1 is a sectional view of a die with a roller which has been compressed therein. Figs. 2 and 3 are detail views showing a form of sectional die; and Figs. 4 and 5 are views of a roller illustrating one way of making it with an anti-slipping surface.

The die for forming my improved wheels or rollers may be of any suitable ordinary construction.

In the drawings I have illustrated a bed-plate, A, in or on which the bottom B of the die is seated. The sides of the die are formed by a removable steel ring, which fits over the bottom of the die and receives the forming-plunger C. A blank or circular block, D, of vulcanized fiber cut from a plate of the material of a diameter less than that of the die and having a thickness greater than the completed roller is to have, is placed in a ring of the die and subjected to heavy pressure. Under the pressure the material flows so as to fill all parts of the die, and yet retains its homogeneous, compact character, and is hardened and condensed throughout its entire body, and specially at the rim. The die should be shaped so as to produce the configuration of roller desired complete without any further operation. The rollers thus formed may then be centered and drilled. I prefer, however, to drill the bearing-hole in the blank before it is inserted in the die, and place a steel pin or spud, E, through the blank, so that when the ring of the die is in place the spud will be seated in the central hole in the bottom of the die. The upper end of the spud is received by a similar socket or aperture in the top or plunger of the die, so that when the pressure is applied to the material it is held centrally in the die, and when from the pressure the material has been flowed so as to fill the die completely, it is obvious that the roller produced will be perfect without any further operation.

In the drawings the die is formed so as to produce a roller with a projecting hub and a concave annular depression between the hub and the rim. This form of roller is well adapted for roller-skates and various other purposes.

The material when subjected to pressure is dry, and may be cold or heated somewhat. When heated, less pressure is required.

Where any other than a straight periphery is to be given the wheel, the die must be correspondingly shaped, and in that event the ring would have to be made in sections. One form of such a sectional ring is illustrated in Figs. 2 and 3. In that case the ring is divided into two flanged sections, F F', which are keyed together by inclined wedges $f$, as will be perfectly plain from the drawings.

For some purposes it is desirable that the rollers should be formed with anti-slipping surfaces—as, for instance, where they are to be used as friction-rollers for transmitting power, or for roller-skates on very smooth surfaces. In that event the die may have a pebbled surface, as shown at G in Fig. 3; or a mixture of glue and emery, sand, or ground glass, or other suitable material may be applied to the rim of the blank before it is placed in the die and allowed to harden. Then when the blank is formed under heavy pressure in the die the grit employed becomes embedded in the periphery of the roller; or the sectional ring of the die may be formed with several annular fins or ribs which form the roller upon an initial pressure with a series of annular grooves or depressions in the periphery, as in Fig. 4. These grooves may then be filled with a mixture of grit with some suitable carrying medium, and the wheel replaced in the die and subjected to another pressure, when the gritty compound will be firmly clamped and embedded in the grooves, as in Fig. 5. In Fig. 1, where a roller which has been subjected to pressure in the die is seen in section, I have endeavored to indicate the relative hardness of the different portions of the roller by the shading.

I am aware that heretofore it has been proposed to form knife-handles of vulcanized fiber by subjecting the material to pressure in a die. I am also aware that wheels made of paper-pulp have been formed in a die.

I have spoken above only of vulcanized fiber; but I consider other materials—such as gelatinized fiber, leatheroid, and such like materials—within the scope of my invention, as they in many respects closely resemble vulcanized fiber.

I claim—

1. A compressed molded roller or wheel made of vulcanized fiber or like material and formed under pressure in a suitable die.

2. As a new article of manufacture, a roller or wheel of vulcanized fiber or like material having a rim relatively harder than the body of the wheel.

3. As a new article of manufacture, a roller of vulcanized fiber or like material having an anti-slipping periphery.

4. The herein-described method of making rollers of vulcanized fiber or like material, which consists in taking a blank of dry vulcanized fiber, centering it in a die upon a pin or spud, and then forming the wheel under pressure in said die.

5. The herein-described method of making rollers of vulcanized fiber or like material, which consists in taking a circular blank of dry vulcanized fiber of a somewhat less diameter than the die in which it is to be formed, and then flowing or forming the material into a roller of the desired shape under pressure in the die.

In testimony whereof I have hereunto subscribed my name.

FRANKLIN TAYLOR.

Witnesses:
H. M. GRANT,
E. M. TAYLOR.